(12) United States Patent
Wang et al.

(10) Patent No.: US 10,444,529 B2
(45) Date of Patent: Oct. 15, 2019

(54) POLARIZED LIGHT SOURCE AND DISPLAY APPARATUS

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Qian Wang, Beijing (CN); Xiaochuan Chen, Beijing (CN); Wenqing Zhao, Beijing (CN); Jian Gao, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 155 days.

(21) Appl. No.: 15/526,571

(22) PCT Filed: Jul. 1, 2016

(86) PCT No.: PCT/CN2016/088067
§ 371 (c)(1),
(2) Date: May 12, 2017

(87) PCT Pub. No.: WO2017/166467
PCT Pub. Date: Oct. 5, 2017

(65) Prior Publication Data
US 2018/0188552 A1    Jul. 5, 2018

(30) Foreign Application Priority Data

Mar. 31, 2016  (CN) .......................... 2016 1 0196584

(51) Int. Cl.
| | |
|---|---|
| *F21V 9/14* | (2006.01) |
| *G02B 27/28* | (2006.01) |
| *G02B 5/30* | (2006.01) |
| *G02F 1/1335* | (2006.01) |

(52) U.S. Cl.
CPC ......... *G02B 27/286* (2013.01); *G02B 5/3041* (2013.01); *G02B 5/3066* (2013.01);
(Continued)

(58) Field of Classification Search
CPC .... G02B 27/286; G02B 27/28; G02B 5/3041; G02B 5/3066; G02B 5/30; G02F 1/13362
See application file for complete search history.

(56) References Cited

U.S. PATENT DOCUMENTS

| | | | |
|---|---|---|---|
| 7,079,318 B2 | 7/2006 | Shikama et al. | |
| 2013/0106922 A1* | 5/2013 | Chen ................ | G02F 1/133514 345/690 |

(Continued)

FOREIGN PATENT DOCUMENTS

| | | |
|---|---|---|
| CN | 1476550 A | 2/2004 |
| CN | 103487945 A | 1/2014 |

(Continued)

OTHER PUBLICATIONS

International Search Report dated Dec. 27, 2016 issued in corresponding International Application No. PCT/CN2016/088067.
(Continued)

*Primary Examiner* — Ali Alavi
(74) *Attorney, Agent, or Firm* — Nath, Goldberg & Meyer; Joshua B. Goldberg

(57) ABSTRACT

The invention provides a polarized light source and a display apparatus. The polarized light source comprises: a complete polarizing plate comprising at least one first medium layer and at least one second medium layer, wherein a refractive index of the first medium layer is higher than that of the second medium layer; a reflective layer provided opposite to the complete polarizing plate; a phase retarder provided between the complete polarizing plate and the reflective layer; and a light source unit provided between the phase (Continued)

retarder and the complete polarizing plate, at least part of light emitted by the light source unit being incident on the complete polarizing plate at an incident angle of a Brewster's angle between adjacent first and second medium layers. The polarized light source of the present invention can serve as a light source for other light modulating device or display apparatus.

18 Claims, 2 Drawing Sheets

(52) U.S. Cl.
CPC ....... *G02B 27/283* (2013.01); *G02F 1/13362* (2013.01); *G02B 5/3083* (2013.01)

(56) References Cited

U.S. PATENT DOCUMENTS

2014/0009902 A1* 1/2014 Banin ............... G02F 1/133617
362/19

2015/0323804 A1 11/2015 Wang
2016/0077382 A1* 3/2016 Yasunaga ............... H05B 33/14
362/19

FOREIGN PATENT DOCUMENTS

| CN | 103927949 A | 7/2014 |
| CN | 103995363 A | 8/2014 |
| CN | 104035204 A | 9/2014 |
| CN | 104133316 A | 11/2014 |
| CN | 105652641 A | 6/2016 |
| JP | H9-54211 A | 2/1997 |

OTHER PUBLICATIONS

Office Action dated Feb. 6, 2017 issued in corresponding Chinese Application No. 201610196584.3.

* cited by examiner

10,444,529 B2

POLARIZED LIGHT SOURCE AND DISPLAY APPARATUS

This is a National Phase Application filed under 35 U.S.C. 371 as a national stage of PCT/CN2016/088067, filed Jul. 1, 2016, an application claiming the benefit of Chinese Application No. 201610196584.3, filed Mar. 31, 2016, the content of each of which is hereby incorporated by reference in its entirety.

FIELD OF THE INVENTION

The present invention relates to the field of light source, and particularly relates to a polarized light source and a display apparatus.

BACKGROUND OF THE INVENTION

Nowadays, a polarizing plate is generally used to filter natural light in order to produce linearly polarized light.

However, since the polarizing plate will absorb the component in incident light that cannot be transmitted, its light energy utilization ratio may be only 50% at most in theory, and generally only about 40% in practice, which leads to a great energy waste.

Furthermore, an existing polarizing plate cannot control the direction of transmitted light, and thus is not applicable to some situations that require parallel linearly polarized light (such as, a specific light modulator, a display apparatus, etc.).

SUMMARY OF THE INVENTION

In view of the problem that the existing polarizing plate has a low light energy utilization ratio and cannot control light outgoing direction, the present invention provides a polarized light source and a display apparatus having a high light energy utilization ratio and mutually parallel light outgoing directions.

A technical solution employed to solve the technical problem of the present invention is a polarized light source, comprising:

a complete polarizing plate comprising at least one first medium layer and at least one second medium layer, wherein a refractive index of the first medium layer is higher than a refractive index of the second medium layer;

a reflective layer provided opposite to the complete polarizing plate;

a phase retarder provided between the complete polarizing plate and the reflective layer; and a light source unit provided between the phase retarder and the complete polarizing plate, at least part of light emitted by the light source unit being able to be incident on the complete polarizing plate at an incident angle of a Brewster's angle between the first medium layer and the second medium layer that are adjacent to each other.

Preferably, the complete polarizing plate comprises a plurality of first medium layers and a plurality of second medium layers, and the first medium layers and the second medium layers are alternately provided in a thickness direction of the complete polarizing plate.

Preferably, the refractive index of the first medium layers is higher than the refractive index of the second medium layers by 0.1 to 0.2.

Preferably, the light source unit is configured to emit parallel light, and the parallel light is incident on the complete polarizing plate at an incident angle of the Brewster's angle between the first medium layer and the second medium layer that are adjacent to each other.

Further preferably, the light source unit comprises a light emitting device and a light collimator that is provided at a light outgoing side of the light emitting device.

Preferably, the light source unit comprises a plurality of light emitting devices, the light outgoing sides of the light emitting devices all facing a first direction; and projections of the plurality of light emitting devices along the first direction on the complete polarizing plate are distributed in at least two different positions.

Further preferably, the plurality of light emitting devices are arranged in multiple lines along a direction perpendicular to the direction along which they are projected.

Preferably, the phase retarder is a quarter wave plate.

Preferably, the polarized light source further comprises: a light modulating unit provided at a side of the complete polarizing plate away from the phase retarder and configured to change a direction of linearly polarized light emitted out from the complete polarizing plate at the Brewster's angle to be perpendicular to the complete polarizing plate.

Further preferably, the light modulating unit comprises a third medium layer parallel to the complete polarizing plate, a plurality of micro-protrusions are provided on a side of the third medium layer facing the complete polarizing plate, the micro-protrusions have inclined planes parallel to one another, and linearly polarized light emitted out from the complete polarizing plate at the Brewster's angle can be refracted to a direction perpendicular to the complete polarizing plate after being emitted into the third medium layer from the inclined planes.

A technical solution employed to solve the technical problem of the present invention is a display apparatus, comprising the above polarized light source.

The polarized light source of the present invention can serve as a light source in other light modulating device or display apparatus.

Figure 1:
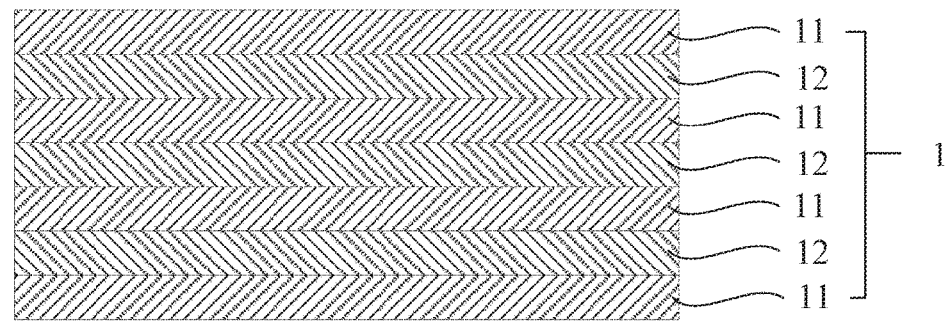
FIG. 1 is a schematic cross-sectional view of a structure of a complete polarizing plate.

Reference numerals: 1, complete polarizing plate; 11, first medium layer; 12, second medium layer; 2, reflective layer; 3, phase retarder; 41, light emitting device; 42, light collimator; 5, light modulating unit; 51, third medium layer; 52, micro-protrusion; 521, inclined plane; b, Brewster's angle

DETAILED DESCRIPTION OF THE EMBODIMENTS

In order to make those skilled in the art better understand the technical solutions of the present invention, the present invention is further described in detail below in conjunction with the accompanying drawings and specific implementations.

First Embodiment

As shown in FIGS. 1 to 4, this embodiment provides a polarized light source.

The polarized light source of this embodiment refers to a light source that can produce linearly polarized light having mutually parallel propagation directions and a same polarization direction. The polarized light source is applicable to any situation that requires parallel linearly polarized light, e.g., it can serve as a light source for other light modulating device or display apparatus, which is not described in detail herein.

Specifically, the above polarized light source comprises:

a complete polarizing plate 1 comprising a first medium layer 11 and a second medium layer 12, wherein a refractive index of the first medium layer 11 is higher than that of the second medium layer 12;

a reflective layer 2 provided opposite to the complete polarizing plate 1;

a phase retarder 3 provided between the complete polarizing plate 1 and the reflective layer 2; and a light source unit provided between the phase retarder 3 and the complete polarizing plate 1, at least part of light emitted by the light source unit being able to be incident on the complete polarizing plate 1 at an incident angle of a Brewster's angle b (that is, a complete polarizing angle) between the first medium layer 11 and the second medium layer1 2.

As illustrated in FIG. 1, the complete polarizing plate 1 is a device formed by a first medium layer 11 (an optically denser medium layer) and a second medium layer 12 (an optically thinner medium layer) that have different refractive indexes. Function of the complete polarizing plate 1 is in that, for light incident thereon at an incident angle of the Brewster's angle b between the two mediums, transmitted light and reflected light become linearly polarized light (that is, p component and s component in the initial incident light) whose polarization directions are perpendicular to each other.

Preferably, as illustrated in FIG. 1, the complete polarizing plate 1 comprises a plurality of first medium layers 11 and a plurality of second medium layers 12, and the first medium layers 11 and the second medium layers 12 are alternately provided in a thickness direction of the complete polarizing plate 1.

As illustrated in FIG. 1, the numbers of the first medium layers and the second medium layers in the complete polarizing plate 1 that serves as a practically used device are more than one, and the first medium layers and second medium layers are alternately arranged (i.e., arranged in turn in a sequence of "first medium layer 11-second medium layer 12-first medium layer 11-second medium layer 12- . . . "). In this way, complete polarization may occur in an interface of every two adjacent medium layers, and every complete polarization may reduce the ratio of s component in the transmitted light (refracted light), such that the transmitted light may be equivalent to linearly polarized light (that is, p component in the initial incident light).

Preferably, two outermost layers of the complete polarizing plate 1 are both the first medium layers 11.

That is to say, preferably, the two outermost layers of the complete polarizing plate 1 are both optically denser medium layers having a higher refractive index, this is because when light is incident on the complete polarizing plate 1 from air, complete polarization is apt to occur because a difference between reflective indexes of the optically denser medium and the air is big, thus, it is helpful to improve linearly polarized degrees of the transmitted light and the reflected light by taking an optically denser medium layer as an outer layer.

Preferably, the refractive index of the first medium layer 11 is higher than that of the second medium layer 12 by 0.1 to 0.2.

Obviously, the refractive indexes of the first medium layer 11 and the second medium layer 12 should differ sufficiently to reflect the difference therebetween, so as to cause complete polarization; however, too big difference may lead to an unreasonable angle value of the Brewster's angle b (such as, larger than a total reflection angle), and the refractive index difference between 0.1 and 0.2 as stated above is comparatively moderate in general.

Figure 2:
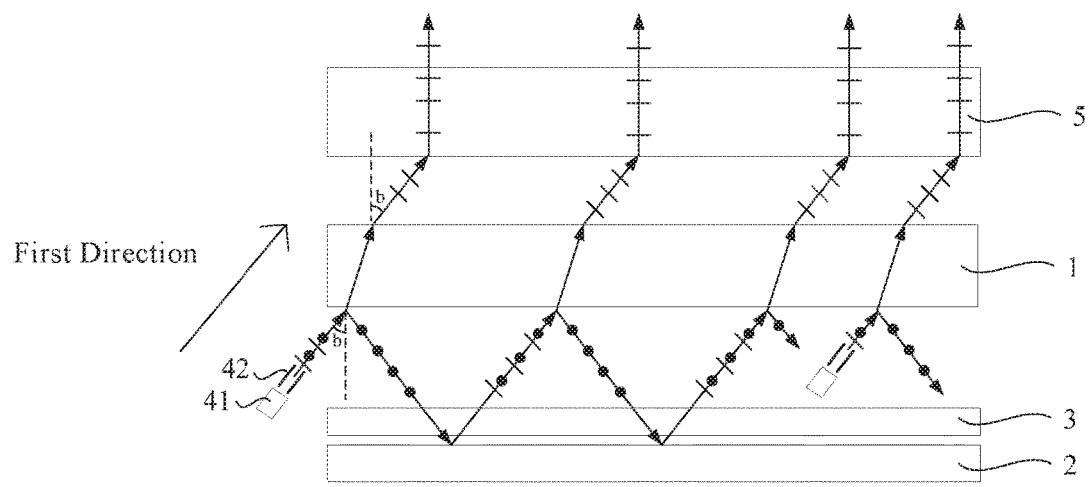
FIG. 2 is a schematic cross-sectional view of a part of a structure of a polarized light source according to an embodiment of the present invention.

As illustrated in FIG. 2, the polarized light source of this embodiment further comprises a light source unit, a reflective layer 2, and a phase retarder 3. The light source unit is configured to emit light towards the complete polarizing plate 1, and at least part of the light emitted thereby can be directly incident on the complete polarizing plate 1 at an incident angle of the Brewster's angle b between the first and second medium layers of the complete polarizing plate 1. Hence, this part of the light will be divided into transmitted light (i.e., p component in the initial incident light) and reflected light (i.e., s component in the initial incident light) whose polarization directions are perpendicular to each other. The linearly polarized light reflected by the complete polarizing plate 1 will be reflected back by the reflective layer 2, and will pass through the phase retarder 3 twice during the reflection to thus regenerate the p component and turn into elliptically polarized light (including circularly polarized light), therefore, the linearly polarized light may be divided again into transmitted light and reflected light whose polarization directions are perpendicular to each other when being incident on the complete polarizing plate 1 again. By repeating this, light transmitted from the complete polarizing plate 1 may finally be parallel to each other and be linearly polarized light having a same polarization direction; moreover, since the complete polarizing plate 1 reflects back, instead of absorbing, light that cannot be transmitted through, the reflected light, after reflected by the reflective layer 2 and retarded by the phase retarder 3, can be incident on the complete polarizing plate 1 again and transmitted partially, thereby greatly increasing the light energy utilization ratio up to 100% in theory.

Preferably, the light source unit is configured to emit parallel light, and the parallel light can be incident on the complete polarizing plate 1 at an incident angle of the Brewster's angle b between the first medium layer 11 and the second medium layer 12.

As stated above, the present invention mainly takes use of light that is incident on the complete polarizing plate 1 at an incident angle of the Brewster's angle b between the first medium layer 11 and the second medium layer 12. Hence, as illustrated in FIG. 2, the light source unit, preferably, merely emits parallel light in this direction, so as to reduce influence from light in other directions.

Further preferably, the light source unit comprises a light emitting device 41 and a light collimator 42 that is provided at a light outgoing side of the light emitting device 41.

Obviously, a typical light emitting device 41 (such as LED) has certain light outgoing angles. That is, it emits light in different directions within the range of the angles. Therefore, as shown in FIG. 2, a light collimator 42 may be provided at the light outgoing side of the light emitting device 41, such that light passing through the light collimator 42 becomes parallel light meeting the above requirements. The light collimator 42 may be in a variety of forms, for example, it may be a cylinder (or slit) having a certain length to ensure that only light parallel (or approximately parallel) to a length direction of the cylinder can pass through. Since it belongs to the prior art that the light collimator 42 may be in a variety of forms; a detailed description will not be given here.

Preferably, the light source unit comprises a plurality of light emitting devices 41, light outgoing sides of the light emitting devices 41 all facing a first direction; and projections of the light emitting devices 41 along the first direction on the complete polarizing plate 1 are distributed in at least two different positions.

Figure 3:
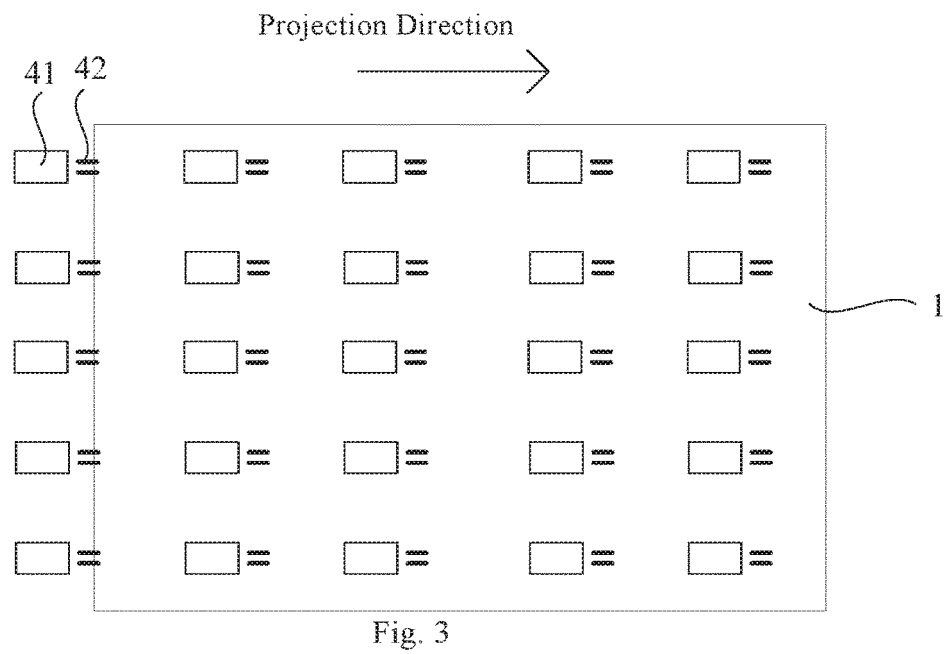
FIG. 3 is a schematic diagram illustrating distribution of light emitting devices in a polarized light source according to an embodiment of the present invention.

That is to say, as illustrated in FIGS. 2 and 3, the light source unit, preferably, comprises a plurality of light emitting devices 41 that emit light towards a same direction (e.g., a direction of the Brewster's angle b), and the direction is referred to as the first direction. The projections of the plurality of light emitting devices 41 along the first direction on the complete polarizing plate 1 are uniformly distributed in at least two different positions.

As stated above, after light emitted by the light emitting devices 41 is incident on the complete polarizing plate 1, the polarization direction of the transmitted light and that of the reflected light are perpendicular to each other, and obviously, intensities of the two types of linearly polarized light are both 50% of that of the initial incident light in theory; when the reflected light is incident again on the complete polarizing plate 1 after passing through the reflective layer 2 and the phase retarder 3, the reflected light may be divided again into transmitted light and reflected light whose polarization directions are perpendicular to each other, and at this time, an intensity of the transmitted light is at most 25% of that of the initial incident light in theory. That is to say, every time the light is incident on the complete polarizing plate 1, an intensity of the transmitted light is decreased at least by half, and the polarized light transmitted from a portion of the complete polarizing plate 1 farther away from the light emitting device 41 necessarily undergoes more times of reflections, and accordingly has a weaker intensity, which thereby influences light outgoing uniformity.

Hence, the above method can be employed, a plurality of light emitting devices 41 are provided at different positions in a direction (referred to as a projection direction) along which the intensity of the transmitted light on the complete polarizing plate 1 decreases, so as to "enhance the intensities" at positions where the light outgoing intensity is weak, and the final light outgoing intensities are relatively uniform due to the combined effect of the plurality of light emitting devices 41.

Preferably, the light emitting devices 41 are arranged in multiple lines along a direction perpendicular to the projection direction.

That is to say, as illustrated in FIG. 3, the plurality of light emitting devices 41 may be arranged in multiple "lines (columns as seen from the Figure)", a plurality of light emitting devices 41 are arranged in each line, and a direction of the "line" is perpendicular to the projection direction. Because light emitted by the plurality of light emitting devices 41 in a same line and transmitted from the complete polarizing plate 1 shall have a same attenuation speed in the projection direction under the condition that the types, light outgoing angles, and other conditions of the light emitting devices 41 are the same. Hence, light emitted by the light emitting devices 41 in a same line (column) may attenuate synchronously in the projection direction, that is, the light emitted by these light emitting devices 41 in the same line must simultaneously attenuate, at a same position in the projection direction, to a same extent that the intensity needs to be enhanced, thus another line (column) of light emitting devices 41 may be exactly provided at said position, so as to better ensure the uniformity of the light outgoing intensities.

Certainly, the light emitting devices 41 can be specifically arranged in various ways. For example, the light emitting devices 41 can be arranged in a matrix as illustrated in FIG. 3, or the number, and position of the light emitting devices 41 in each column may be different, or a gap between columns of the matrix may be different, etc., and the light emitting devices 41 can be arranged in any way as long as the uniformity of the light outgoing intensities can be finally enhanced.

Preferably, the phase retarder 3 is a quarter wave plate.

The linearly polarized light reflected by the complete polarizing plate 1 will pass through the phase retarder 3 twice during the process of being reflected by the reflective layer 2, thus, at this point, the quarter wave plate serving as the phase retarder 3 is equivalent to a half wave plate, and in most cases, the half wave plate can most efficiently increase p component in linearly polarized light, thereby increasing an intensity of the linearly polarized light (p component) emitted out from the complete polarizing plate 1 after reflection.

Preferably, as illustrated in FIG. 2, the polarized light source further comprises: a light modulating unit 5 provided at a side of the complete polarizing plate 1 away from the phase retarder 3 and configured to change a direction of the linearly polarized light emitted out from the complete polarizing plate 1 at the Brewster's angle b to be perpendicular to the complete polarizing plate 1.

Obviously, an emergent angle of the linearly polarized light emitted out from the complete polarizing plate 1 is also the Brewster's angle b between the adjacent first and second medium layers, and cannot be perpendicular to the complete polarizing plate 1 but approximately "arranged inclinedly", which leads to inconvenience in use.

Hence, the light modulating unit 5 may be provided at the side of the complete polarizing plate 1 away from the phase retarder 3 and configured to change the direction of the linearly polarized light emitted out from the complete polarizing plate 1 at the Brewster's angle b to be perpendicular to the complete polarizing plate 1.

Figure 4:
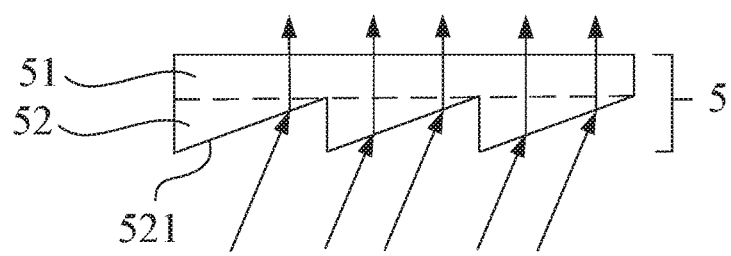
FIG. 4 is a schematic cross-sectional view of a part of a structure of a light modulating unit in a polarized light source according to an embodiment of the present invention.

Further preferably, as illustrated in FIG. 4, the light modulating unit 5 comprises a third medium layer 51 parallel to the complete polarizing plate 1, a plurality of micro-protrusions are provided at a side of the third medium layer 51 facing the complete polarizing plate 1, the plurality of micro-protrusions have inclined planes parallel to each other, and linearly polarized light emitted out from the complete polarizing plate 1 at the Brewster's angle b can be refracted to the direction perpendicular to the complete polarizing plate 1 after being emitted into the third medium layer 51 from the inclined planes 521.

That is to say, as illustrated in FIG. 4, the light modulating unit 5, preferably, comprises a light-transmissive third medium layer 51 that has a plurality of micro-protrusions 52 (such as a plurality of parallel ribs) provided at its light incident side, each micro-protrusion has a inclined plane 521, and an inclined angle of the inclined plane 521 interacts with a refractive index of a material of the micro-protrusion 52, so that the linearly polarized light emitted out from the complete polarizing plate 1 (at the Brewster's angle h) can exactly turn into light in the direction perpendicular to the complete polarizing plate 1 after entering into the micro-protrusions 52 from the inclined plane 521.

Needless to say, the specific structure of the light modulating unit 5 is not limited to this. For example, if the overall size of the polarized light source is not large, the light modulating unit 5 may also be a wedge whose bottom surface is an inclined plane (which can be regarded as connecting the inclined planes 521 of the micro-protrusions 52 together), or the like. And a detailed description will not be given here.

Second Embodiment

This embodiment provides a display apparatus, comprising the above polarized light source.

That is to say, the display apparatus of this embodiment employs the above polarized light source as its light source module. Obviously, the display apparatus further comprises devices other than the light source module, and a detail description will not be given here.

Specifically, the display apparatus may be any product or component having a display function, such as electronic paper, a mobile phone, a tablet computer, a TV set, a display, a notebook computer, a digital photo frame, a navigator, etc.

It should be understood that, the above implementations are only exemplary implementations for illustrating the principle of the present invention, but the present invention is not limited thereto. Various variations and improvements can be made by those skilled in the art without departing from the spirit and essence of the present invention, and these variations and improvements are also considered to be within the protection scope of the present invention.

The invention claimed is:

1. A polarized light source, comprising:
a complete polarizing plate comprising at least one first medium layer and at least one second medium layer, wherein a refractive index of the first medium layer is higher than a refractive index of the second medium layer;
a reflective layer provided opposite to the complete polarizing plate such that the reflective layer is substantially parallel to the complete polarizing plate;
a phase retarder provided between the complete polarizing plate and the reflective layer; and
a light source unit provided between the phase retarder and the complete polarizing plate, at least part of light emitted by the light source unit being able to be incident on the complete polarizing plate at an incident angle of a Brewster's angle between the first medium layer and the second medium layer that are adjacent to each other.

2. The polarized light source according to claim 1, wherein
the complete polarizing plate comprises a plurality of first medium layers and a plurality of second medium layers, and the first medium layers and the second medium layers are alternately provided in a thickness direction of the complete polarizing plate.

3. The polarized light source according to claim 1, wherein
the refractive index of the first medium layer is higher than the refractive index of the second medium layer by 0.1 to 0.2.

4. The polarized light source according to claim 1, wherein
the light source unit is configured to emit parallel light, and the parallel light is incident on the complete polarizing plate at an incident angle of the Brewster's angle between the first medium layer and the second medium layer that are adjacent to each other.

5. The polarized light source according to claim 4, wherein
the light source unit comprises a light emitting device and a light collimator that is provided at a light outgoing side of the light emitting device.

6. The polarized light source according to claim 1, wherein
the light source unit comprises a plurality of light emitting devices, the light outgoing sides of the light emitting devices all facing a first direction; and
projections of the plurality of light emitting devices along the first direction on the complete polarizing plate are distributed in at least two different positions.

7. The polarized light source according to claim 6, wherein
the plurality of light emitting devices are arranged in multiple lines along a direction perpendicular to the direction along which they are projected.

8. The polarized light source according to claim 1, wherein
the phase retarder is a quarter wave plate.

9. The polarized light source according to claim 1, further comprising:
a light modulating unit provided at a side of the complete polarizing plate away from the phase retarder and configured to change a direction of the linearly polarized light emitted out from the complete polarizing plate at the Brewster's angle to be perpendicular to the complete polarizing plate.

10. The polarized light source according to claim 9, wherein
the light modulating unit comprises a third medium layer parallel to the complete polarizing plate, a plurality of micro-protrusions are provided at a side of the third medium layer facing the complete polarizing plate, the micro-protrusions have inclined planes parallel to each other, and linearly polarized light emitted out from the complete polarizing plate at the Brewster's angle is able to be refracted to a direction perpendicular to the complete polarizing plate after being emitted into the third medium layer from the inclined planes.

11. The polarized light source according to claim 2, further comprising:
a light modulating unit provided at a side of the complete polarizing plate away from the phase retarder and configured to change a direction of the linearly polarized light emitted out from the complete polarizing plate at the Brewster's angle to be perpendicular to the complete polarizing plate.

12. The polarized light source according to claim 2, wherein
the refractive index of the first medium layer is higher than the refractive index of the second medium layer by 0.1 to 0.2.

13. The polarized light source according to claim 2, wherein
the light source unit is configured to emit parallel light, and the parallel light is incident on the complete polarizing plate at an incident angle of the Brewster's angle between the first medium layer and the second medium layer that are adjacent to each other.

14. The polarized light source according to claim 13, wherein
the light source unit comprises a light emitting device and a light collimator that is provided at a light outgoing side of the light emitting device.

15. The polarized light source according to claim 2, wherein
   the light source unit comprises a plurality of light emitting devices, the light outgoing sides of the light emitting devices all facing a first direction; and
   projections of the plurality of light emitting devices along the first direction on the complete polarizing plate are distributed in at least two different positions.

16. The polarized light source according to claim 15, wherein
   the plurality of light emitting devices are arranged in multiple lines along a direction perpendicular to the direction along which they are projected.

17. The polarized light source according to claim 2, wherein
   the phase retarder is a quarter wave plate.

18. The polarized light source according to claim 11, wherein
   the light modulating unit comprises a third medium layer parallel to the complete polarizing plate, a plurality of micro-protrusions are provided at a side of the third medium layer facing the complete polarizing plate, the micro-protrusions have inclined planes parallel to each other, and linearly polarized light emitted out from the complete polarizing plate at the Brewster's angle is able to be refracted to a direction perpendicular to the complete polarizing plate after being emitted into the third medium layer from the inclined planes.

* * * * *